United States Patent
Kilbourne, II et al.

(10) Patent No.: US 7,839,123 B1
(45) Date of Patent: Nov. 23, 2010

(54) APPARATUS AND IMPLEMENTATION OF A BATTERY IN A NON VOLATILE MEMORY SUBSYSTEM

(75) Inventors: Allen J. Kilbourne, II, Castle Rock, CO (US); George Totolos, Jr., Cranberry Township, PA (US)

(73) Assignee: Network Appliance, Inc., Sunnyvale, CA (US)

( * ) Notice: Subject to any disclaimer, the term of this patent is extended or adjusted under 35 U.S.C. 154(b) by 0 days.

(21) Appl. No.: 12/718,248

(22) Filed: Mar. 5, 2010

Related U.S. Application Data

(62) Division of application No. 11/701,103, filed on Jan. 31, 2007, now Pat. No. 7,710,075.

(51) Int. Cl.
    *H02J 7/00* (2006.01)
(52) U.S. Cl. .................. 320/132; 320/134; 320/137
(58) Field of Classification Search .................. 320/132
    See application file for complete search history.

(56) References Cited

U.S. PATENT DOCUMENTS

| | | | |
|---|---|---|---|
| 5,428,769 A | 6/1995 | Glaser et al. | |
| 5,936,383 A | 8/1999 | Ng et al. | |
| 6,938,184 B2 | 8/2005 | Totolos, Jr. | |
| 6,956,356 B2 | 10/2005 | Elder | |
| 7,202,631 B2 | 4/2007 | Breen et al. | |
| 2006/0192530 A1 | 8/2006 | Nguyen | |

OTHER PUBLICATIONS

BQ2010, NiCd/NiMH Gas Gauge with 1-Wire (DQ) Interface and 5 LED Drivers, Texas Instruments, downloaded Dec. 12, 2006 from http://focus.ti.com/docs/prod/folders/print/bq2010.html, 3 pages.

*Primary Examiner*—Edward Tso
*Assistant Examiner*—Ahmed Omar
(74) *Attorney, Agent, or Firm*—Blakely, Sokoloff, Taylor & Zafman LLP

(57) ABSTRACT

The battery apparatus introduced here provides a tool for reliably measuring the run time to empty of a battery used in a network storage server for protection of data during a failure mode. The battery run time to empty can be determined by a management controller based on battery information generated by a controller and received at the management controller. The information received at the management controller includes run time to empty, voltage, current and current battery capacity.

7 Claims, 6 Drawing Sheets

APPARATUS AND IMPLEMENTATION OF A BATTERY IN A NON VOLATILE MEMORY SUBSYSTEM

This application is a divisional of U.S. patent application Ser. No. 11/701,103, filed on Jan. 31, 2007 now U.S. Pat. No. 7,710,075 entitled "Apparatus and Implementation of a Battery in a Non Volatile Memory Subsystem, and allowed on Dec. 15, 2009.

TECHNICAL FIELD

This invention relates to the field of computer systems and, in particular, to a battery for providing power for a nonvolatile memory in a network storage system.

BACKGROUND

During the operation of a network storage system, data is typically stored on one or more disks of the storage system. A simple example of a network storage system configuration is illustrated in FIG. 1. A storage server 2A is coupled to a set of mass storage devices 4 and to a set of clients 1 through a network 3, such as a local area network (LAN). Each of the clients 1 may be, for example, a conventional personal computer (PC), workstation, or the like. The mass storage devices 4 may be, for example, conventional magnetic disks, optical disks such as CD-ROM or DVD based storage, magneto-optical (MO) storage, or any other type of non-volatile storage devices suitable for storing large quantities of data.

One method by which data is sometimes stored by a storage server, such as a file server, is to temporarily store (buffer) the data in main memory within the storage server before storing the data on a disk. The temporary storage of data in main memory, which is normally some form of random access memory (RAM), permits high speed access to the data. Periodically, during the operation of the storage system, the data buffered in main memory is stored to the disks of the storage system. Typically, the disks have a slower access rate than the main memory in the storage server. Thus, by providing fast access to data, the response time from data request to data delivery is short.

However, any storage system may experience various types of failure, such as a loss of power. Such failures can result in the inability to store or retrieve data. Depending on the cause, downtime can last for a few seconds or may last for longer periods of time, such as hours or days. When a failure such as loss of power occurs, data that was buffered in the main memory may not yet have been stored to the disks. Consequently, the data may be lost. This situation may cause data inconsistencies, because when the disks are accessed after the storage system recovers from the downtime, the data stored in the disks is not up to date.

In some storage systems, protection against such data loss is achieved by providing a non-volatile RAM (NVRAM) in the storage server in addition to its main memory. This NVRAM is used to store data only until the data can be stored on disk. To build an NVRAM, a battery can be attached to a conventional RAM to enable the RAM to continue to operate when the storage system experiences a loss of main power. However, the downtime can last for long periods of time. During these periods of time, the battery used to provide power for the NVRAM will discharge, possibly to a point where the battery fails to provide enough power, causing the data stored in the NVRAM to be lost. It is therefore desirable to reduce the risk of an NVRAM failing during a main power outage due to total battery discharge.

One solution is to calculate voltage curves of the battery, which are used during design time to predict the expected battery run time during discharge, e.g., in the event of a failure such as main power loss. The battery run time is the time remaining until the battery is fully discharged. This prediction is generally accurate when a battery is new, but as the battery ages this method is less accurate due to capacity loss from aging. One way to solve the capacity loss problem is to calculate during design time how much capacity is needed and make the battery large enough to survive a predetermined length of time (e.g. in years) even after capacity loss. However, this solution does not provide an accurate prediction of the "health" of the battery to determine remaining capacity of the battery. The "health" of the battery can be determined as a combination of the voltage, resistance, impedance and/or temperature of the battery.

Thus, what is needed is a solution that provides accurate prediction of the health of a battery to determine remaining capacity of the battery, particularly in the context of a battery used to power an NVRAM in a storage server.

SUMMARY OF THE INVENTION

The present invention includes an apparatus for determining the remaining useable time of a battery. The apparatus includes a battery that is used to provide power to a non-volatile memory in a network storage server. The apparatus also includes a controller and a management controller. The controller generates information about the battery and outputs the information to the management controller. The management controller then calculates the remaining useable time of the battery based on the battery information.

Other aspects of the invention will be apparent from the accompanying figures and from the detailed description which follows.

BRIEF DESCRIPTION OF THE DRAWINGS

The present invention is illustrated by way of example, and not by way of limitation, in the figures of the accompanying drawings.

DETAILED DESCRIPTION

Figure 1:
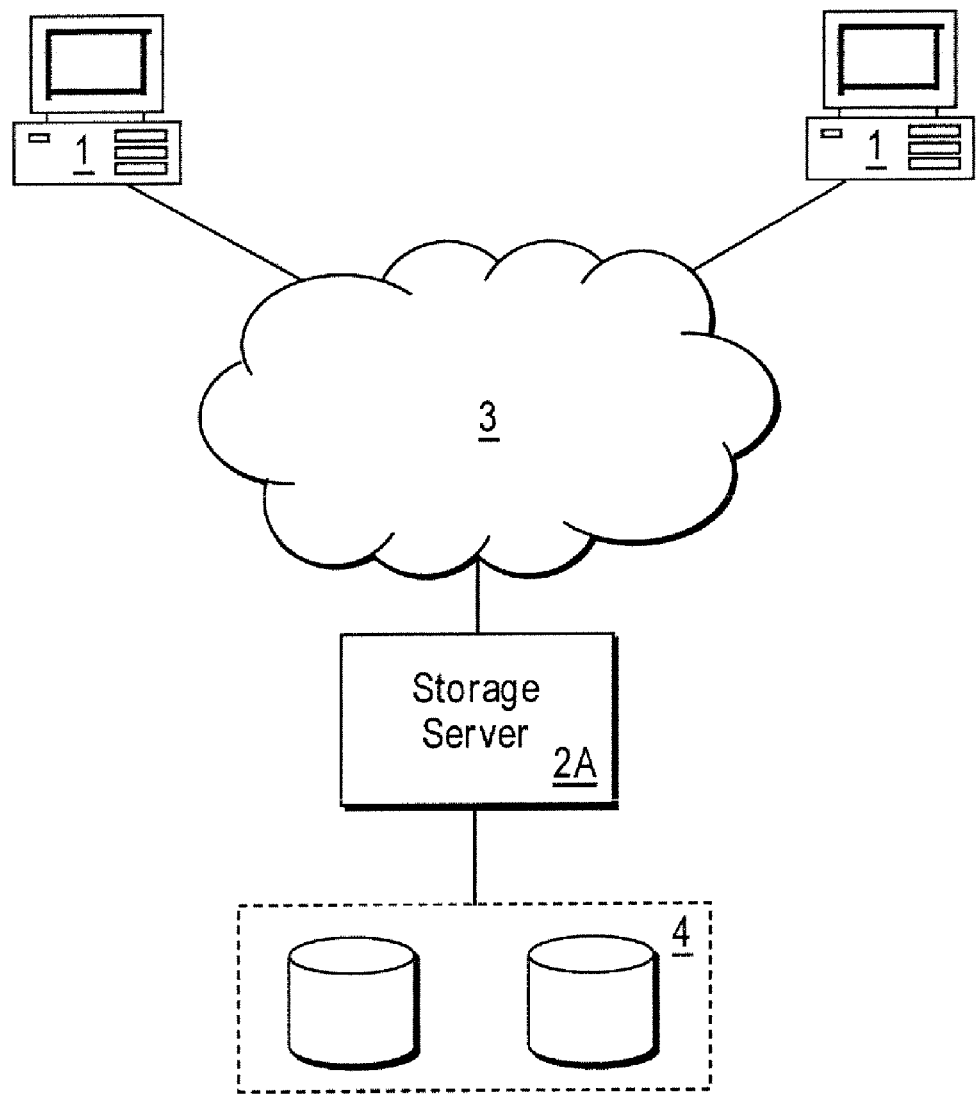
FIG. 1 is a simple example of a network storage system configuration.

Described herein is a battery back-up scheme and a battery apparatus for reliably measuring the health and status of a battery, such as may be used for a non-volatile random access memory (NVRAM) in a network storage server for protection of data during a failure of the system. The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to facilitate understanding. Thus, the specific details set forth are merely exemplary. Particular implementations may vary from these exemplary details and still be contemplated to be within the spirit and scope of the present invention.

With the battery apparatus introduced here, the lifetime and "health" of a battery can accurately be determined, to ensure that the battery can be relied upon when a failure condition occurs. By providing the information, the battery apparatus reduces the risk of a battery failure occurring during a main power outage, which would cause data loss. The battery apparatus further reports environmental and functional data over a communication bus, in order to allow the host system (e.g. a storage server operating system) or a designated computer in the network (e.g. a storage management console) to monitor the battery health and function.

One advantageous solution to handle a fault condition such as the failure of the main power supply for a non-volatile memory system is to use a battery back-up scheme referred to herein as a "battery apparatus". The non-volatile memory and supporting circuitry in a network storage server are powered from the main power supplies of the network storage server most of the time. However, in the event of a fault condition, e.g. main power failure, the source of power is switched from the power supply to the battery apparatus.

The battery apparatus introduced here provides a tool for reliably measuring the run time to empty of a battery used in a network storage server for protection of data during a failure mode. The battery run time to empty can be determined by a management controller based on battery information generated by a controller and received at the management controller. The information received at the management controller includes run time to empty, voltage, current and current battery capacity. The details of this technique are explained below.

Note that to facilitate the description, the techniques introduced herein are described as being implemented in a storage server. It is to be understood, however, that these techniques can alternatively be implemented in other types of systems and devices.

Figure 2:
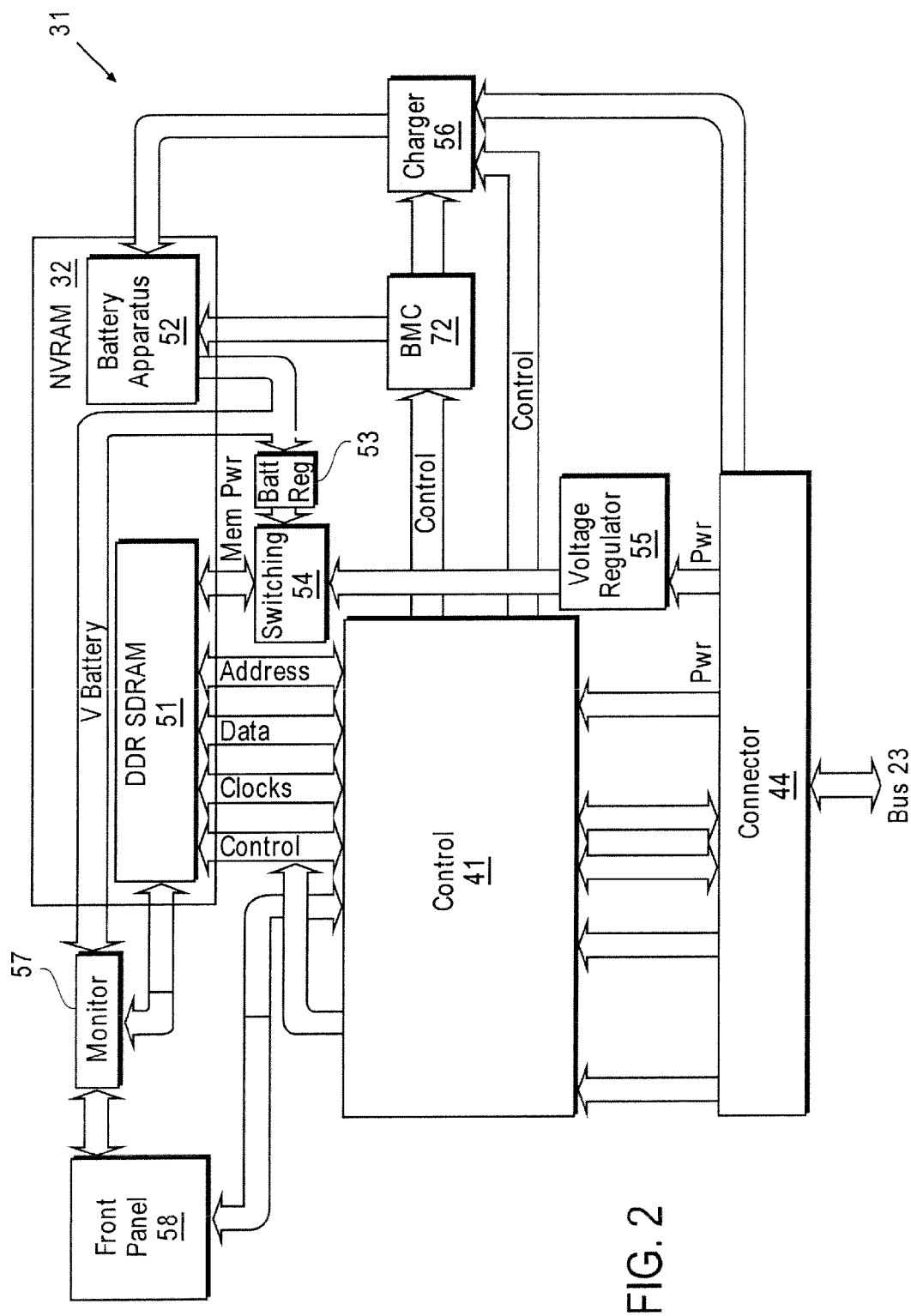
FIG. 2 is a block diagram of a NVRAM subsystem according to embodiments of the invention.

FIG. 2 illustrates a Non-Volatile Random Access Memory (NVRAM) subsystem 31, according to certain embodiments of the invention, such as may be used in a storage server. The NVRAM subsystem 32 may be implemented in a storage server, such as shown in FIG. 1 for example. In particular, FIG. 2 shows details of a NVRAM 32, a control circuitry 41, and other components of the NVRAM subsystem 31. The NVRAM 32 in the illustrated embodiment is implemented by a double data rate synchronous dynamic RAM (DDR SDRAM) 51, which is made nonvolatile by providing it with regulated backup power from an onboard battery apparatus 52. The control circuitry 41 communicates information received from the battery apparatus 52 to an operating system of the storage server or another computer in the network 3 (FIG. 1, described above). The battery apparatus power is provided through a regulator 53 to a switching circuitry 54, which provides the SDRAM 51 with either the regulated power from the battery apparatus 52 or regulated system power received through a connector 44. A second voltage regulator 55 receives system power through a bus 23 and outputs regulated system power to the switching circuitry 54 and the control circuitry 41.

Normally, the SDRAM 51 receives regulated system power (e.g. main power of the storage server), however, if the system power drops below a predetermined voltage threshold, the switching circuitry 54 switches the SDRAM 51 onto regulated battery power from the battery apparatus 52. A battery charger 56 receives system power from the bus 23 to charge the battery apparatus 52 under control of the control circuitry 41.

Figure 4:
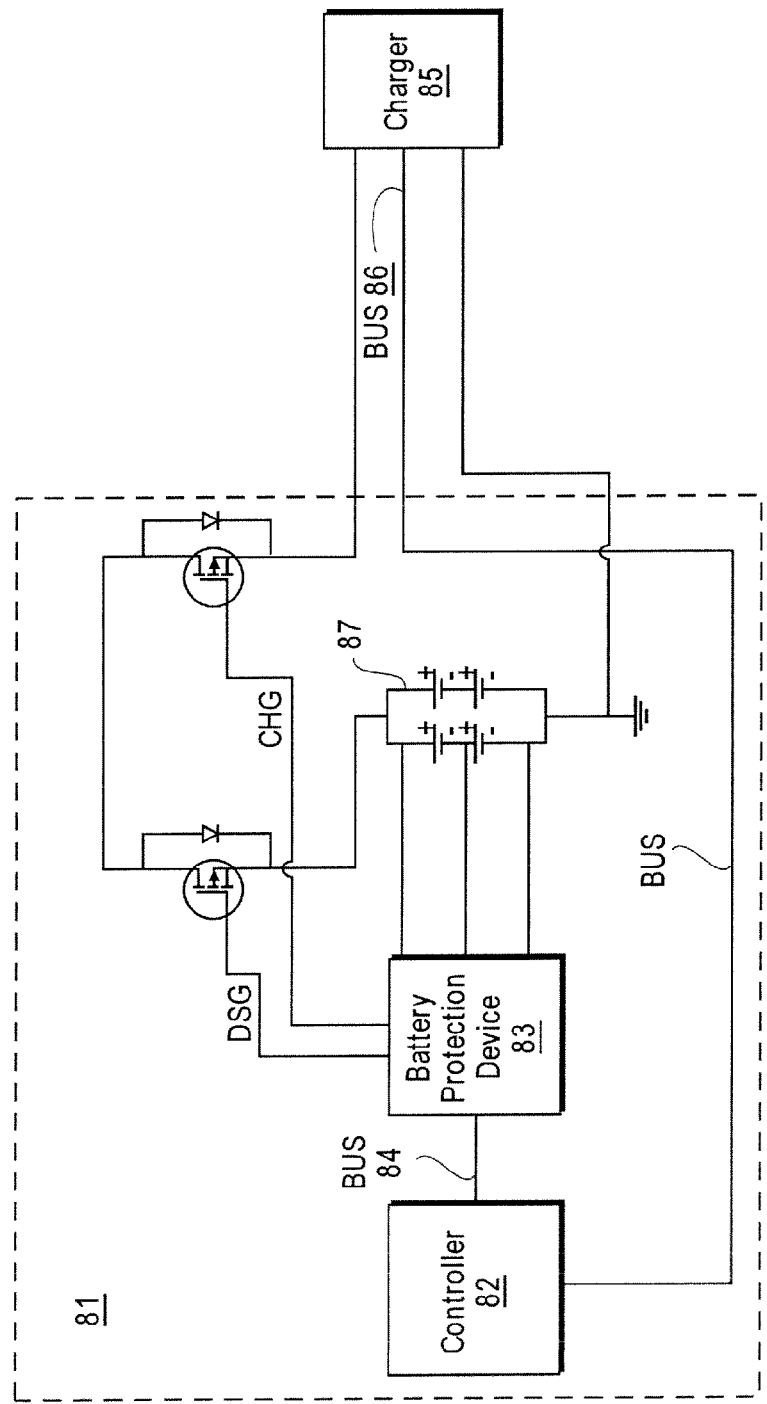
FIG. 4 illustrates one embodiment of the battery apparatus and a charger.

The NVRAM subsystem 31 also includes a monitor 57 to monitor the battery voltage and the status of the SDRAM 51. The battery apparatus 52 generates battery information, e.g. battery capacity and/or battery voltage, that is communicated to a baseboard management controller 72 (BMC). The BMC 72 can communicate battery status, such as the remaining useable time of the battery, to an operating system of the host system via the control circuitry 41. A front panel display 58 of the NVRAM subsystem 31 outputs information communicated from the BMC 72 to the control circuitry 41 to facilitate monitoring of the battery 87 (FIG. 4, described below).

Figure 3:
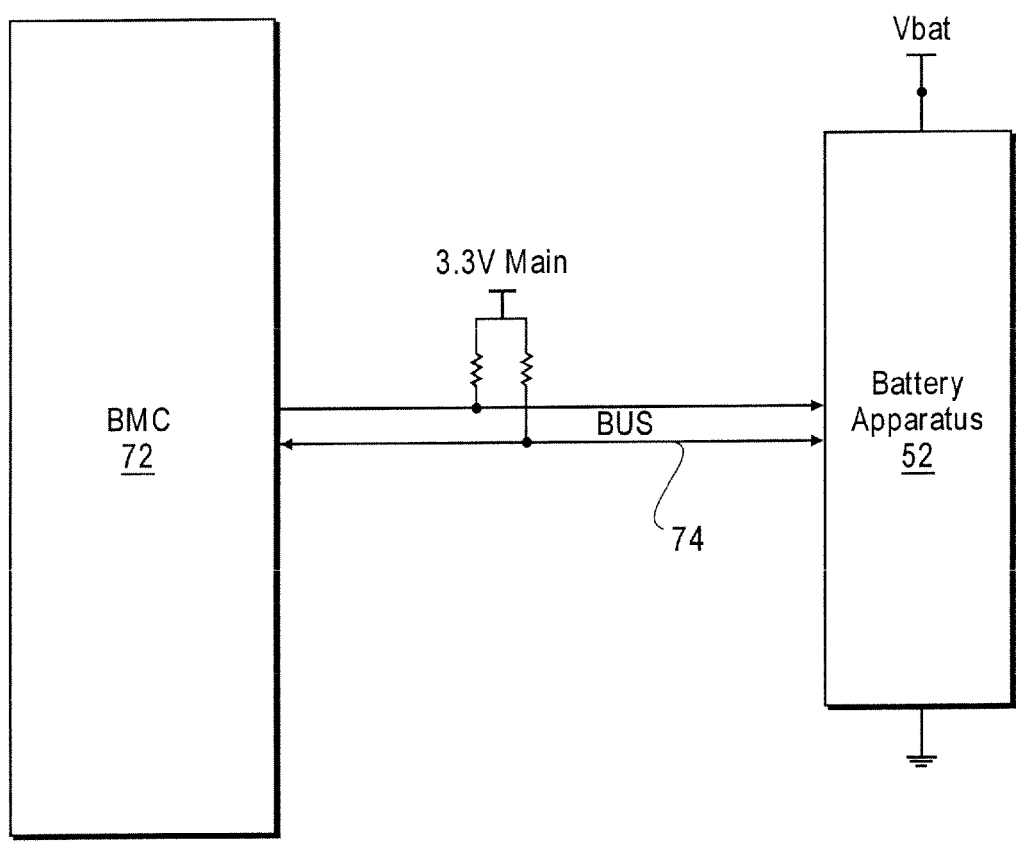
FIG. 3 illustrates one embodiment of a circuit in which a battery apparatus according to the invention operates.

An example of the application of the process is now described further in FIG. 3. FIG. 3 illustrates one embodiment of a circuit 70 including the baseboard management controller BMC 72 and the battery apparatus 52 described in FIG. 2 above. Battery information, such as battery capacity and battery voltage, is generated by the controller 82 (FIG. 4, described below) and outputted to the BMC 72 via a bus 74.

The BMC 72 calculates a "measured" battery run time to empty, where the battery run time to empty is defined as the remaining useable time, e.g. in hours, of the battery 87 (FIG. 4, described below) and the "measured" value of this parameter is calculated using Equation (1) below.

$$T_M = T_B * I * V / P \qquad (1)$$

Where:
$T_M$=measured runtime to empty in hours (h);
$T_B$=run time to empty generated by the controller while under artificial load, measured in hours (h);
I=measured battery current generated by the controller 82 while under artificial load in (mA)
P=theoretical power under real load in milliwatts (mW); and
V=measured battery voltage generated by the controller 82 while under artificial load in (mV)

Every hour, for example, the BMC 72 makes a measurement by first turning off the battery charger 73, then turning on an artificial load to the battery that closely matches the load that will be incurred upon power fault. While the battery is sourcing the artificial load, the BMC 72 reads three parameters from the battery apparatus 52 (i.e., controller 82): 1) Battery Run Time to Empty; 2) Battery Voltage; and 3) Battery Current. Normally, the only parameter that matters is the Battery Run Time to Empty. However, a correction factor can be applied that takes into account the fact that the power consumed during this test may not exactly match the current drawn during a power fault. This discrepancy may be due to, for example, manufacturing and environmental variations. To determine the correction factor, the power consumed during the test (Battery Voltage*Battery Current) is calculated to get the "Test Power". Then the Test Power is divided by a constant in software that represents the "Theoretical Power" consumed by the system (memory and supporting circuitry) during a fault as predetermined during design. The "Test Power" divided by "Theoretical Power" provides the correction factor that is multiplied by the Run Time to Empty generated by the controller 82 and outputted to the BMC during the measurement using the artificial load.

The BMC also computes a "calculated" battery run time to empty is also using equation (2) below. Similarly to the "measured" value calculation, the BMC 72 also determines the "calculated" value of the battery run time to empty by creating an artificial load and receiving a current battery capacity measurement (mAh) that is generated by the controller 82.

$$T_C = I_h * V/P \qquad (2)$$

Where:
- $T_C$ = calculated runtime to empty in hours (h);
- $I_h$ = current battery capacity generated by the controller 82 in (mAh)
- P = theoretical power under real load in milliwatts (mW); and
- V = measured battery voltage generated by the controller 82 in (mV)

A BMC output is reported to the host operating system and/or to a designated computer in the network 3 (e.g. a storage management console). The BMC output may include an error message if the "measured" and "calculated" values of the battery run time to empty exceeds or is below a threshold value.

Note that in other embodiments, a software process can be substituted for the BMC 72, or the BMC can be replaced by some combination of hardware and software.

FIG. 4 illustrates an embodiment of a battery apparatus and a charger. The battery apparatus 81 is configured to power a non-volatile memory (e.g. NVRAM) in a network storage server 2A (FIG. 1, described above) upon a failure mode, e.g. main power failure. The battery apparatus 81 includes a battery 87 and a controller 82, where the controller 82 can be, for example a gas-gauge integrated circuit or the like. The controller 82 generates battery information, such as battery capacity and battery voltage, and outputs the battery information to the BMC 72 (FIG. 3, described above) via a bus 74 (FIG. 3, described above). With the output from the controller 82, the BMC 72 can compare the "measured" and "calculated" battery run time to empty as discussed above.

In one embodiment a battery protection device 83 is coupled to the controller 82 via a bus 84. The battery protection device 84 is configured to provide protection for conditions of overcharge, overload, short circuit, overvoltage and undervoltage, and it can extract battery parameters from the controller 82 to accomplish this goal.

When the voltage of the battery 87 drops below a threshold voltage, a charge voltage and charge rate is communicated by the controller in the battery apparatus 81 to a charger 73 (e.g., by hardware signaling) via a bus 86 to initiate the charging of the battery 87. The battery apparatus 81 transmits the charge voltage and charge rate at intervals that may be, for example, less than or equal to 60 seconds, to activate the charger 85 to charge the battery 87 to the appropriate voltage level. When the battery apparatus 81 detects that a charging current has dropped below a threshold (using any well-known current measurement technique) over a given period of time, for example 60 seconds, the battery apparatus 81 may terminate charging by the charger and set a Threshold Crossing Alert (TCA) bit in the controller 82. A TCA bit indicates that a certain parameter, for example charging current of the battery 81, has exceeded or dropped below a certain threshold value. The charger is enabled when the TCA bit is cleared by the battery apparatus 81.

Figure 5:
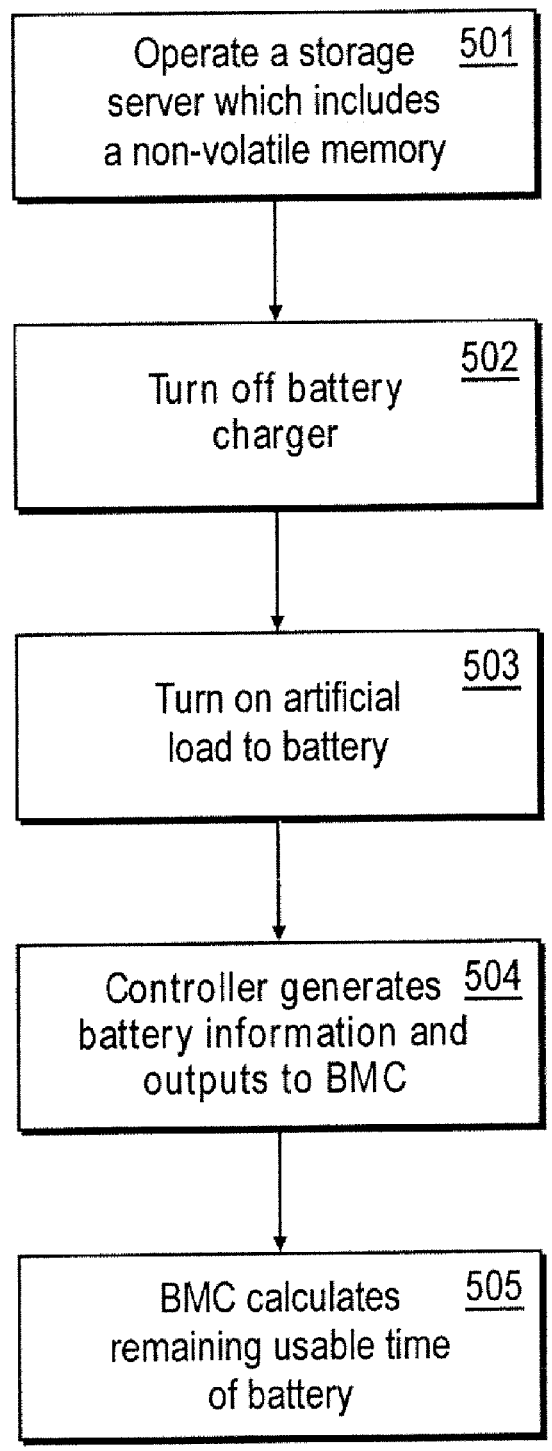
FIG. 5 is a flow chart illustrating one embodiment of a process for determining the remaining usable time of a battery.

FIG. 5 is a flow chart illustrating one embodiment of a process for determining the remaining usable time of a battery. In operation 501 the battery apparatus 81 operates in a network storage server to provide back-up power for a non-volatile memory of the network storage server. In operation 502, the battery charger 73 is turned off and at 503 an artificial load is turned on to the battery, where the artificial load closely matches the load that will be incurred during a power failure. In operation 504, the controller 82 generates the battery information including the run time to empty, battery current, battery voltage and current battery capacity and outputs the information to the BMC. In operation 505, the BMC 72 calculates the remaining useable time of the battery in the manner described above (equation (1), as described above).

Figure 6:
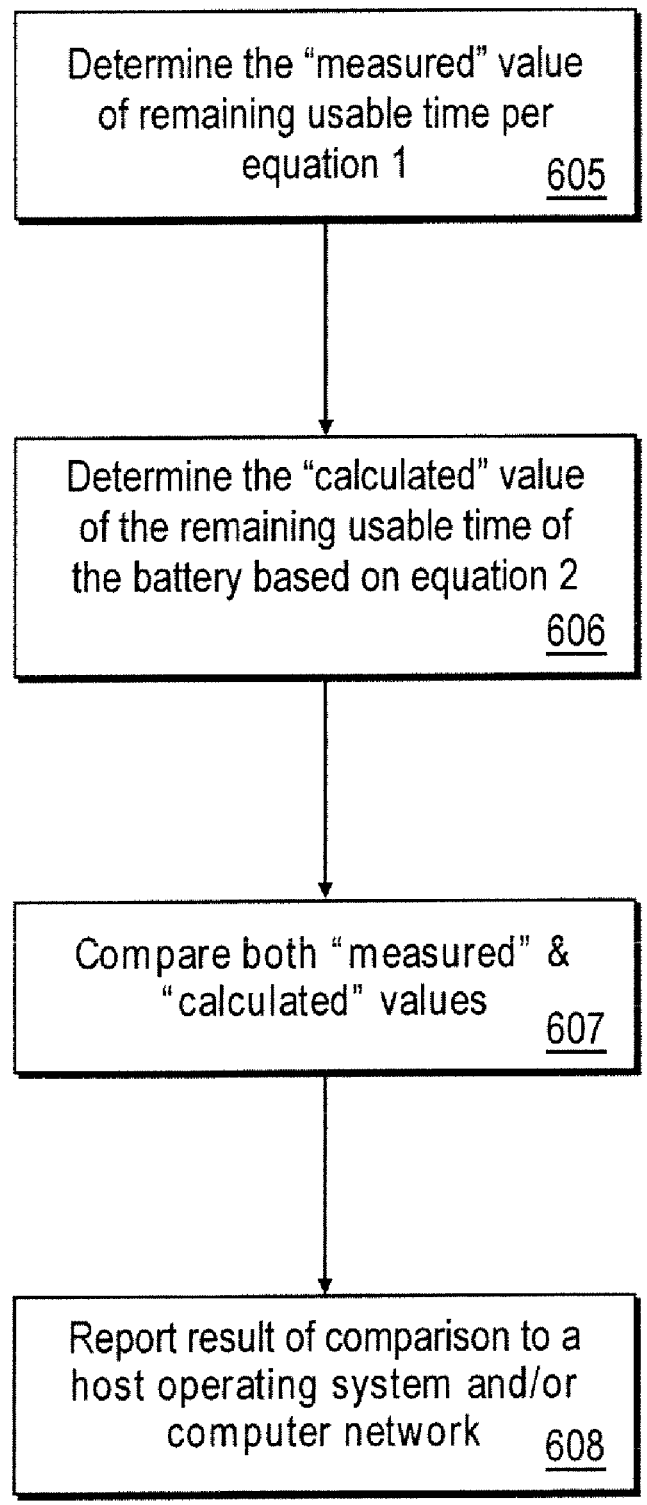
FIG. 6 is a flow chart illustrating the process of confirming the remaining useable time of the battery 87.

FIG. 6 is a flow chart illustrating the process of confirming the remaining useable time of the battery 87, which may be implemented in the BMC 72. Operations 601, 602, 603 and 604 are essentially the same as operation 501, 502, 503 and 504. In operation 605, the "calculated" value of the remaining useable time of the battery is determined by the BMC 72 using equation 2 above. In operation 606, the BMC determines the "measured" values of the remaining useable time of the battery based on equation (1) above. In operation 607, the BMC 72 compares both "measured" and "calculated" values of the remaining useable time of the battery to confirm the remaining useable time of the battery. In operation 608, the BMC 72 reports its output to the host operating system and/or to a designated computer on the network such as a management console. The output reported by the BMC can include an error if the difference between the "calculated" and "measured" values of the remaining useable time of the battery exceeds or is below a threshold value.

This solution can be applied to make network servers more reliable, because it can safely and accurately predict when a battery for main power backup can sufficiently sustain memory during a failure mode, or whether the battery is about to or already has failed and requires replacement.

The invention claimed is:

1. An apparatus comprising:
   a battery to power a non-volatile memory in a network storage server;
   a first controller coupled to the battery to generate battery information comprising a battery run-time-to-empty parameter, a battery voltage parameter, a battery current parameter, and a battery capacity parameter; and
   a management controller coupled to the first controller to read the battery information from the first controller while the battery is under an artificial load, to determine a first remaining useable time of the battery based on the battery information, to determine a second remaining useable time of the battery based on the battery information, and to determine a status of the battery using the first remaining useable time and the second remaining usable time.

2. The apparatus of claim 1, wherein the management controller calculates the remaining useable time of the battery based on an artificial load that approximates an actual load on the battery expected to occur during a power loss.

3. The apparatus of claim 1, wherein the first controller is a gas-gauge integrated circuit.

4. The apparatus of claim 1, wherein the battery is switchable to provide power to the non-volatile memory in the case of a loss of power from a main power supply of the storage server.

5. The apparatus of claim 1, wherein the non-volatile memory is a non-volatile random access memory (NVRAM).

6. The apparatus of claim 1, further comprising a protection device configured to provide protection for the battery for conditions of overcharge, overload, short circuit, overvoltage and undervoltage.

7. The apparatus of claim 6, wherein the protection device is coupled to the first controller via a bus.

* * * * *